May 12, 1970          J. L. DURAND          3,512,019

ELECTROMAGNETIC DEVICE

Filed Feb. 21, 1968          6 Sheets-Sheet 1

*INVENTOR.*
JOSEPH L. DURAND

BY

ATTORNEY

May 12, 1970        J. L. DURAND        3,512,019

ELECTROMAGNETIC DEVICE

Filed Feb. 21, 1968        6 Sheets-Sheet 2

INVENTOR.
JOSEPH L. DURAND
BY
ATTORNEY

May 12, 1970     J. L. DURAND     3,512,019
ELECTROMAGNETIC DEVICE Filed Feb. 21, 1968     6 Sheets-Sheet 3

FIG. 4

INVENTOR.
JOSEPH L. DURAND

BY

ATTORNEY

FIG. 6

INVENTOR.
JOSEPH L. DURAND

BY

ATTORNEY

May 12, 1970        J. L. DURAND        3,512,019
ELECTROMAGNETIC DEVICE Filed Feb. 21, 1968        6 Sheets-Sheet 5

INVENTOR.
JOSEPH L. DURAND
BY
ATTORNEY

May 12, 1970 J. L. DURAND 3,512,019
ELECTROMAGNETIC DEVICE

Filed Feb. 21, 1968 6 Sheets-Sheet 6

FIG. 8

INVENTOR.
JOSEPH L. DURAND
BY
Roy M. Pitts
ATTORNEY

United States Patent Office 3,512,019
Patented May 12, 1970

3,512,019
ELECTROMAGNETIC DEVICE
Joseph L. Durand, Woodland Hills, Calif., assignor to Systems Technology Inc.
Filed Feb. 21, 1968, Ser. No. 707,028
Int. Cl. H02k 37/00
U.S. Cl. 310—49
24 Claims

ABSTRACT OF THE DISCLOSURE

A stepper motor or incremental electrical motor having a polyphase stator, which provides an incremental or discrete angular movement of an output element in response to each of a series of spatially commutated inputs. A plurality of no fewer than three radially-arranged, uniformly spaced electromagnetic stator field pieces describe the locus of a circle having a geometric center. A rigid ring-like rotor of magnetic material having a radius differing from that of the locus is rotatably mounted for hypocyclic motion about the locus in response to sequential excitation of the electromagnetic field pieces.

BACKGROUND OF THE INVENTION

Frequently, it is desired to provide an incremental, or discrete, angular movement of a shaft in response to either an open-loop or closed loop motor control input. Such discrete angular motion may be employed in a hybrid computing system in which both analog and digital signalling techniques are combined. For example, a discrete shaft position may be desired in response to a selected state of a polyphase rotatable field.

Where extremely small increments of angular motion are preferred in response to such excitation, without the inertia, weight and volume of a gear train, a harmonic gear drive, integral with the motor element, has been employed. Such integral motor and harmonic drive units are described, for example, in the following U.S. patents: 3,311,766 issued to G. P. Scott for High Responsive Actuator; 3,169,202 issued to H. W. Proctor et al. for Electromagnetic Actuators Having Continuously Rotating Field; 3,169,201 issued to W. P. Spring et al. for Electromagnetic Harmonic Drive; 2,906,143 issued to Musser for Strain Wave Gearing.

Such electromagnetic actuators conventionally comprise a coaxial arrangement of three cooperating elements: a stator reaction ring, a flex tube and a polyphase rotating field. The coaxial flexible tube is of magnetic material and, in one embodiment, forms a magnetic flexible tubular gear external of a stator reaction ring gear and internal of the polyphase rotating field source. The polyphase magnetic field source provided by a plurality of pairs of diametrically opposed electromagnetic poles, each successive pair being excited in sequence by a polyphase source of excitation for urging the magnetic flexible tubular gear into engagement with the ring gear at two opposed points corresponding to the minor axis of an ellipse. The spatial rotation of the polyphase field causes such minor axis (of the ellipse-shaped flexible gear) to "walk around" the stator ring gear, the rotation of a peripheral point on the flexible gear about the common longitudinal axis (of the coaxial iarrangement) each polyphase cycle being a function of the circumferential difference between the stator ring gear and the magnetic flexible tubular gear.

The above-described prior art arrangement of three coaxial elements, while serving to combine motion reduction with electromagnetic motors actions, is subject to several inherent design limitations. First, because of the coaxial motor arrangement employed, at least three elements are required, namely a stator ring gear in addition to the rotating field and magnetic flexible tubular gear. Also, because the external rotating field cooperates to attract diametrically opposite points of the magnetic, flexible tubular gear to a corresponding pair of diametrically opposite field pieces (thereby describing a major axis of an ellipse shape and urging the resulting minor axis of the flexible tubular gear into engagement with the stator ring gear), the design is limited to at least two equally spaced pairs of diametrically opposite poles, the poles of each pole pair adapted for simultaneous excitation. Further, the rotatable tubular gear is required to combine the properties of being both magnetic and flexible.

These combinations of design limitations of the above-described prior art coaxial motor arrangement seriously limit the application of such principle to miniaturized designs for compact, high-density electronic data processors and the like. In other words, the miniaturization of reliable electromechanical computing elements has not proceeded at the same rate as the circuit components with which such electromechanical elements are associated.

SUMMARY OF THE INVENTION

By means of the concept of the subject invention, there is provided an electromechanical output element or stepper motor of fewer component parts, and simple design, which lends itself to small yet reliable design configurations.

In a preferred embodiment of the invention there is provided a plurality of no fewer than three radially-arranged, uniformly spaced electromagnetic field pieces, radial ends of which field pieces describe the locus of a circle having a geometric center. A rigid ring-like rotor of magnetic material, having a radius differing from that of the locus, is rotatably mounted for hypocyclic motion about such locus, in response to sequential exictation of the electromagnetic field pieces.

By means of such arrangement, the functions of the stator reaction ring and rotating field are combined in the radial arrangement of field pieces, while the use of a magnetic flexible tubular gear is avoided, a simple rigid magnetic ring being used as an output member. Such simpler device of fewer components is inherently more reliable than prior art devices. Further, because a flexible magnetic element is not relied upon, as a motor element, such device is less expensive to manufacture and easier to miniaturize. Accordingly, it is an object of the object invention to provide an improved stepper motor.

It is another object of the invention to provide a stepper motor of fewer component parts.

It is still another object of the invention to provide a device of fewer parts for combining the functions of a stepper motor and motion reduction.

A further object is to provide an electromechanical actuator which may be reliably and less expensively miniaturized.

These and other objects of the invention will be more fully appreciated from the following description, taken together with the accompanying drawings, in which:

BRIEF DESCRIPTION OF THE DRAWINGS

In the drawings, like reference characters refer to like parts.

DESCRIPTION OF THE PREFERRED EMBODIMENT OF THE INVENTION

Figure 1:
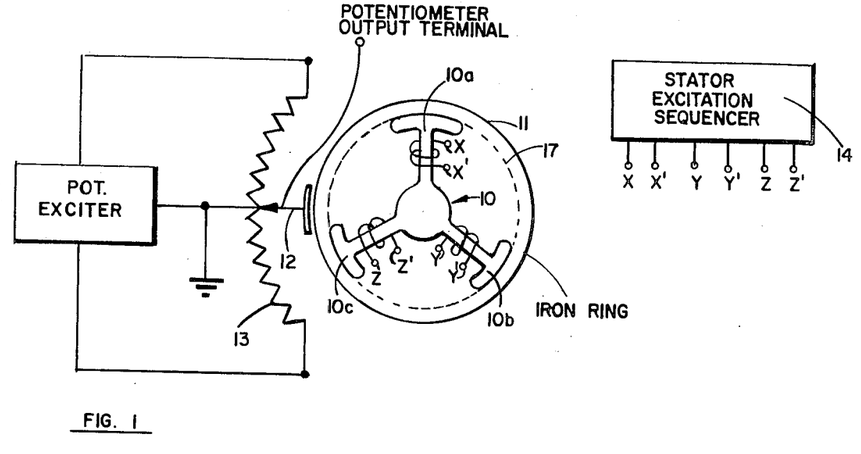
FIG. 1 is a schematic arrangement of a device embodying the concept of the invention.
Figure 2A:
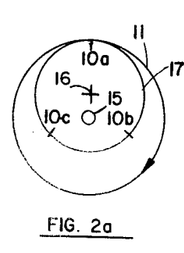
FIGS. 2a, 2b, 2c and 2d are illustrations of the locus of the hypocyclic motion of the rotor of FIG. 1, resulting from polyphase excitation of the stator field.
Figure 2B:
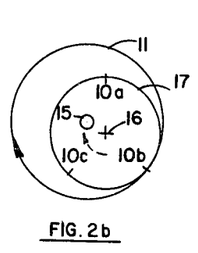
Figure 2C:
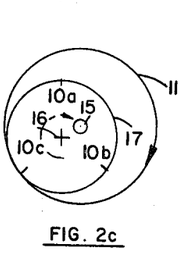
Figure 2D:
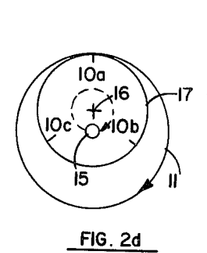

Referring now to FIG. 1, there is illustrated a schematic arrangement of a device embodying the concept of the invention. There is provided a stator 10 or plurality of no fewer than three electromagnetic field pieces or pole pieces 10a, 10b and 10c, equi-angularly spaced, the outer radial ends of which describe the locus of an inner circle having a radius, $D_1$. An outer circle of radius $D_2$ is formed by a radially rigid ring 11 of magnetic material, such as for example, soft iron, having an inner radius $D_2$, to which may be attached the wiper 12 of a potentiometer assembly, the wiper cooperating in electrical circuit with a resistive element 13.

In normal operation of the arrangement of FIG. 1, a polyphase power source, a commutative element, or a logic sequence power-switching device, shown in FIG. 1 as block element 14, applies an electrical excitation in sequence to the windings of successive ones of field pieces 10a, 10b and 10c. Thus, the ring is attracted to successive ones of the pole pieces 10a, 10b and 10c as to be made to roll around the internal circle (of radius $D_1$) represented by the radial array of such pole pieces, as is shown more clearly in FIGS. 2a, 2b, 2c and 2d.

FIGS. 2a, 2b, 2c and 2d show the rotor 11 of FIG. 1 in successive ones of discrete positions representing the locations of the pole faces of pole pieces 10a, 10b and 10c, in response to a polyphase excitation of the stator. The motion of the center 15 of outer ring 11 is seen, in FIGS. 2a, 2b, 2c and 2d, to describe a small circle about the center 16 of the inner circuit or dotted locus 17, as the outer ring 11 rolls about the inner ring 17. However, the actual circumferential motion or travel of a peripheral point on outer ring 11 for each complete cycle or roll about ring 17 is only $2\pi d = 2\pi (D_2 - D_1)$, rather than $2\pi D_2$. Therefore, the device of FIG. 1 functions as a motion reduction device, the reduction ratio, $$\frac{D_2 - D_1}{D_2} = \frac{d}{D_2}$$

becoming smaller as the inner diameter $D_1$ approaches the magnitude of the outer diameter $D_2$.

The direction of rotation of ring 11 may be reversed by reversing the direction or sequence of the excitation cycle. The angular position of iron ring 11 in FIG. 1 may be indicated by the conventional cooperation of elements 12 and 13 of the position pick-off potentiometer. Also, although the three stator field windings have been illustrated as comprising six terminals, $XX^1$, $YY^1$, and $ZZ^1$, it is clear that a star connection may be used, whereby a single common terminal is employed for $X^1$, $Y^1$ and $Z^1$.

Also, the device of FIG. 1 may be arranged as an unenclosed device in which rotor 11 is rotatably supported by a flexible shaft extending internally and concentrically through an enlarged longitudinal or axial aperture within stator 10 and a lower bearing. Thus, it is to be appreciated that rotor 11 may be manually or otherwise rotationally indexed without the necessity of declutching means. In such latter arrangements the pick-off means may be mounted externally of the motor bearing.

Further, although the concept has been illustrated in terms of a device in which the rotor 11 encloses the pole faces of the stator about which it rolls, it is to be appreciated that an alternative arrangement is contemplated in which the rotor is encompassed by the pole faces about which it rolls. In other words, an "inside-out" version is comprehended.

Figure 3:
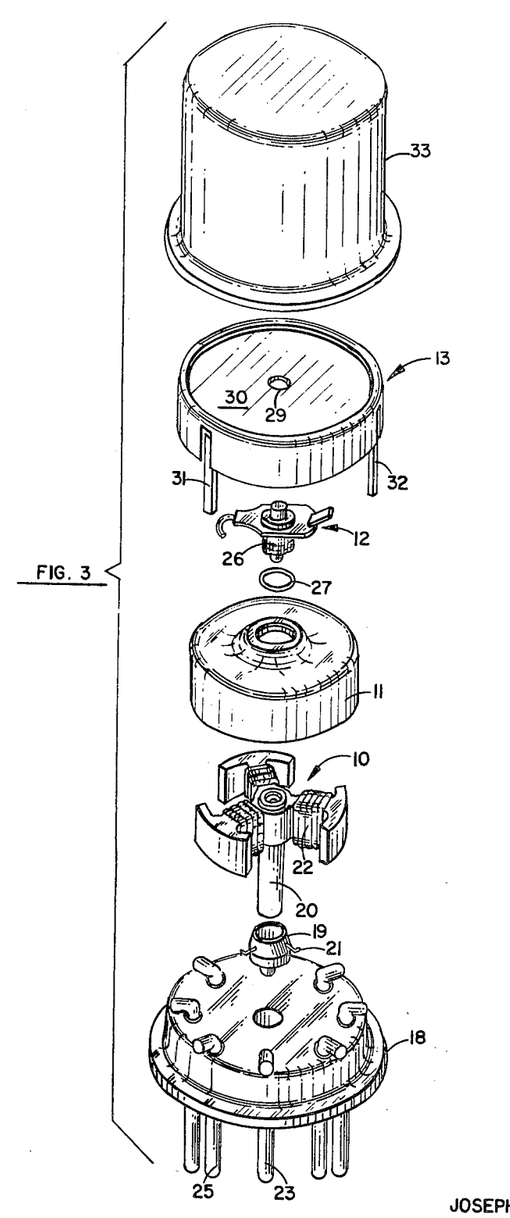
FIG. 3 is an isometric view of a preferred embodiment of the invention, showing the mode of coupling the hypocyclic motion of the rotor to provide a useful rotary output.
Figure 4:
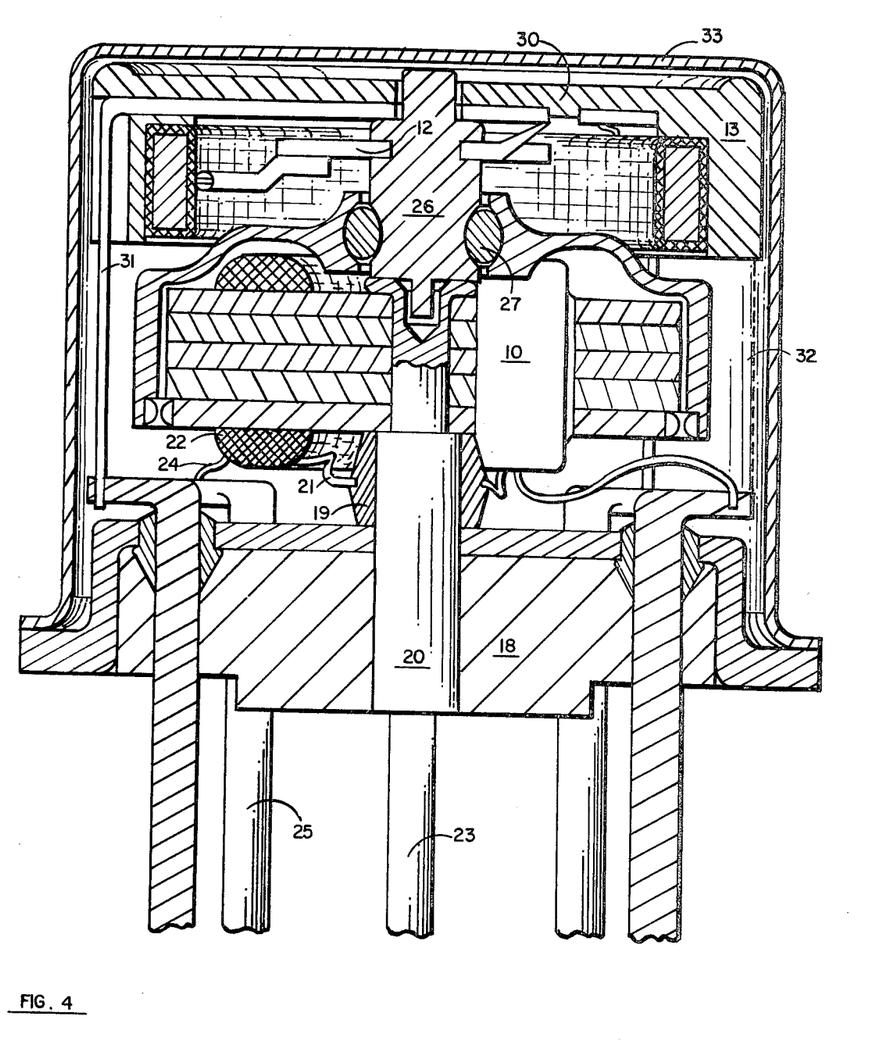
FIG. 4 is a vertical section view of the assembly of FIG. 3.

A preferred embodiment of the concept of FIG. 1 is shown in FIGS. 3 and 4.

Referring to FIGS. 3 and 4 there is illustrated an exploded view (in perspective) and a vertical center section, respectively, of a preferred arrangement embodying the inventive concept. There is provided a stator assembly 10, magnetic rotor 11, potentiometer wiper 12 and resistive potentiometer element 13, all arranged to cooperate substantially the same as like-referenced elements of FIG. 1. Stator assembly 10 is non-rotatably secured to a base 18 by means of a mounting 19, into which an axial extremity of a shaft end 20 of stator 10 is secured. Mounting 19 also serves as an electrical stuffing box for the connection of a first terminal 21 of each of stator windings 22 to a central terminal 23 in base 18, in the manner of a star-connected polyphase circuit. The second terminal 24 of each stator winding 22 is connected in electrical circuit to a mutually exclusive one of the electrical terminals 25 insulated from and projecting through base 18 in a peripheral arrangement (shown more particularly in FIG. 3).

Magnetic rotor 11 is secured or frictionally restrained and generally concentrically mounted upon a shaft 26 (in FIG. 4) of potentiometer wiper element 12, as to be secured or frictionally restrained thereto by aid of an elastic O-ring 27 seated within annular grooves provided for such purpose, shaft 26 being journalled into an electrically insulated bearing element 28 interposed at or inserted in the upper axial end of stator shaft 20. A second bearing or axial guide for the opposite end of shaft 26 (of potentiometer wiper element 12) is provided by an aperture 29 in a top plate 30 of potentiometer resistive element 13. Resistive element 13 is non-rotatably mounted relative to case 18 by means of the electrical and mechanical connection of terminal leads 31 and 32 thereof to respective ones of terminals 25 in base 18. The entire assembly is protected by means of a cover or cap 33, which may be press-fit or otherwise secured to base 18. Cap 33 may be of a suitable material for providing electromagnetic shielding, if desired.

In normal operation of the above-described arrangement of FIGS. 3 and 4, an edge of lip portion of rotor cup 11 is attracted to a pole face of stator 10, whereby the axis of rotor cup 11 is tilted slightly, relative to the longitudinal axis of shaft 26 (in FIG. 4), which tilting is suffered by the compliance of O-ring 27. However, the hypocyclical motion of the mouth of rotor cup 11 about stator 10 is thus elastically coupled by O-ring 27 to shaft 26 to induce rotation thereof, the rate of such rotation being in a reduced ratio to the commutation rate of excitation of stator 10. In other words, due to the maximum nominal radial clearance between the lower edge of cup 11 and stator 10, and the minimum nominal radial clearance at the upper end of cup 11, commutative or polyphase excitation of stator 10 urges rotor cup 11 in a lateral direction relative to the axis of shaft 26, resulting in motion of a slightly conical nature for the axis of cup 11.

The arrangement of FIGS. 3 and 4, when operated in cooperation with external commutative circuitry, may be employed as a stepper motor or as a reversible electromechanical pulse integrator, the potentiometer serving as a memory device. Such arrangement readily lends itself to miniaturization as has been demonstrated by a working model within an overall axial length and diameter of three-eighths inch by three-eighths inch, a three-pole arrangement of such dimension having been constructed and successfully operated at a rate of 450 pulses per second. Further miniaturization and increased pulse rates are to be contemplated by use of conventional production techniques such as, for example, use of etched components and the like.

Under certain conditions, such as operation in vibrational environment, it may be desirable to increase the friction forces restraining movement of the potentiometer wiper during unexcited states of the stator in order to assure the integrity of the memory function. Such friction force restraining means may be provided by electromagnetically releasable, normally spring-loaded brake means, arranged to exert either radial or axial friction as a tangential force by means known in the art for arresting or resisting rotation of the rotor. Alternatively, the spring force of wiper 12 against potentiometer element 13 may be designed to arrest rotor rotation in the absence of stator excitation. Bearing friction may also be increased through increased molecular cohesion induced by hermetically sealing the assembly and then either evacuating it or sealing it with a pressurized inert gas. Where the unit is so sealed with a pressurized inert gas, it may be possible to use higher excitation voltages in excitation of the potentiometer. Also, such sealing prevents contamination.

Although the rotational motion reduction effected by the concept of the invention has been described in terms of the ratio, $(D_2-D_1)/D_2$ in a particular embodiment, such ratio need not be fixed and may, if desired, be made adjustable in a suitable design by the substitution of an axially adjustable cone or driven conical pendulum for the rotor 11, as is understood in the art.

Figure 5:
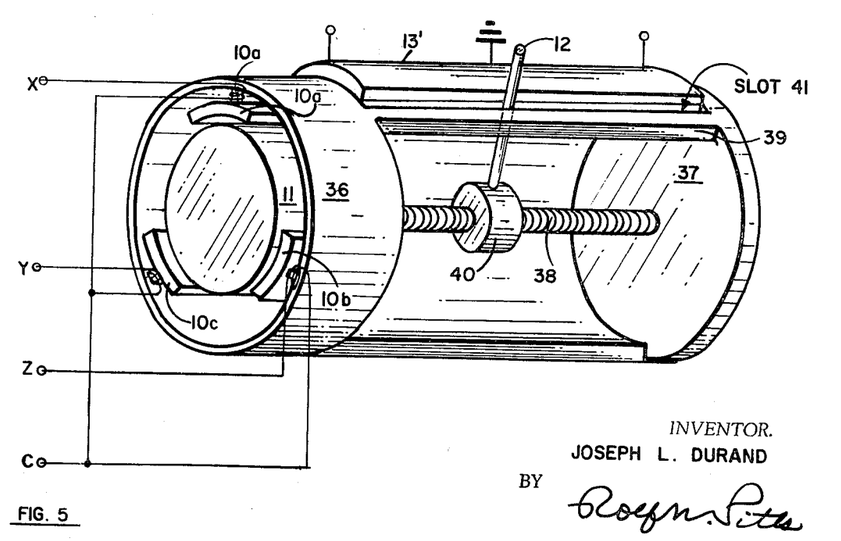
FIG. 5 is an alternate embodiment of the inventive concept and including a screw jack arrangement in cooperation with a rectilinear potentiometer.

Although the cooperation of the potentiometer assembly with the motor drive has been described thus far in terms of a rotary potentiometer, the concept of the invention is not so limited, being adapted to the cooperation of a rectilinear potentiometer with the motor element by means of a screw jack arrangement, as shown more particularly in FIG. 5.

Referring to FIG. 5 there is illustrated a schematic arrangement of an alternative embodiment of the invention, arranged for cooperation with a rectilinear potentiometer and in which the outer surface of the rotor rolls about the faces of stator field pieces arranged externally of the rotor. Stator field pieces 10a, 10b and 10c may be fastened to the inside of a frame or collar 36, defining an axial extremity of a cylindrical frame, the opposite extremity 37 of which frame provides bearing means for rotatably mounting and axially restraining a threaded rod 38 at a like extremity thereof, and at the opposite extremity of which rod 38 rotor 11 is coaxially mounted.

A longitudinal spacer 39 having a longitudinal slot 41 therein, rigidly interconnects elements 36 and 37. A rectilinear potentiometer element 13 is mounted upon and insulated from spacer 39, and oriented adjacent and parallel to slot 41. The purpose of slot 41 is to restrain rotational motion of a potentiometer wiper element 12, protruding therethrough from a female threaded element 40 rotatably mounted on and matingly engaging threaded member 38. However, slot 41 permits axial motion of elements 40 and 12 relative to axially-restrained rod 38, while also allowing electrical contact between wiper 12 and rectilinear potentiometer element 13. The screw-jack cooperation of such arrangement provides further motion reduction, in addition to that provided by the cooperation of elements 10a, 10b and 10c with element 11.

Figure 6:
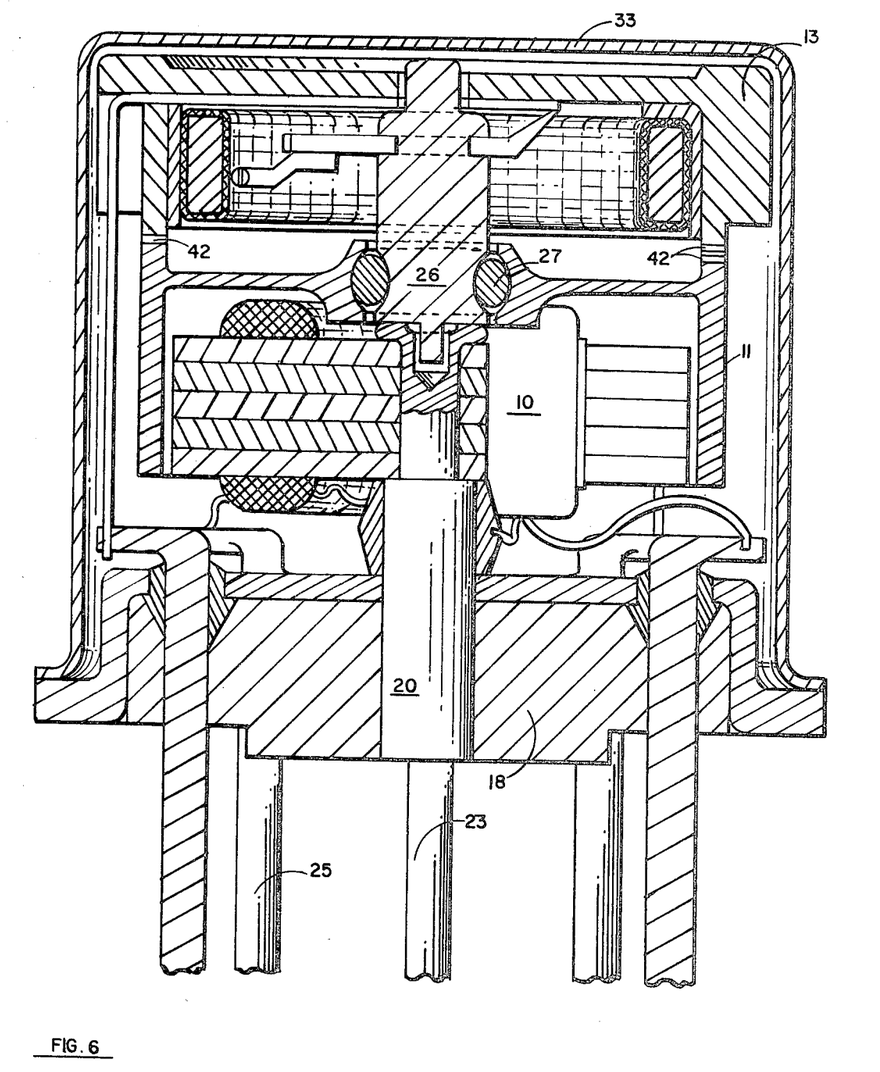
FIG. 6 is an alternate embodiment of the arrangement of FIG. 4 and including a rigid gear for positive motoring action.

Although the motor element has been described thus far as being devoid of positive gearing, rigid gearing is to be contemplated where desired to provide a positive slipless drive or detenting in an open-loop control application. For example, the arrangement of FIG. 4 may be modified as shown more particularly in FIG. 6, in which gear teeth 42 are formed in the mutually opposed peripheral ends of potentiometer element 13 and magnetic cup 11. Alternatively, magnetic gearing may be employed, as shown more particularly in the schematic arrangement of FIG. 7.

Figure 7:
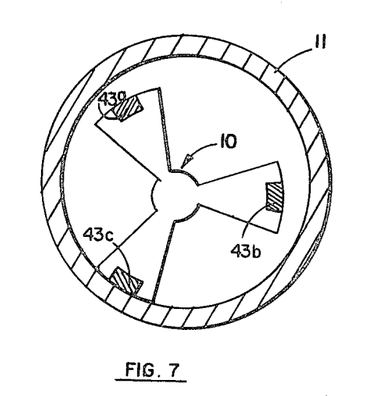
FIG. 7 is a schematic arrangement of an alternate embodiment of the positive motoring feature of FIG. 6 and substituting magnetic means for a mechanical gear.

Referring to FIG. 7, there is shown a magnetic ring or rotor element 11 and a three-pole stator assembly 10, each of the pole faces for which includes a permanent magnet element 43a, 43b, and 43c. During an unexcited state of the stator windings, the cooperation of magnets 43a, 43b and 43c with rotor element 11 tends to maintain element 11 in the orientation associated with the last excitation state. In other words, the rotor is restrained by that pole or pole pair with which it is in intimate contact. The level of excitation employed by the stator windings (not shown) is, of course, selected to be sufficient to overcome such restraint.

The hypocyclic motion and motion reduction obtained by the device of the invention has been described in terms of the ratio of the fixed diameters of the stator assembly and rotor ring. However, such motion need not be limited to a preselected ratio, but may be selectively varied by means of a conical taper arrangement, as shown in FIG. 8.

Figure 8:
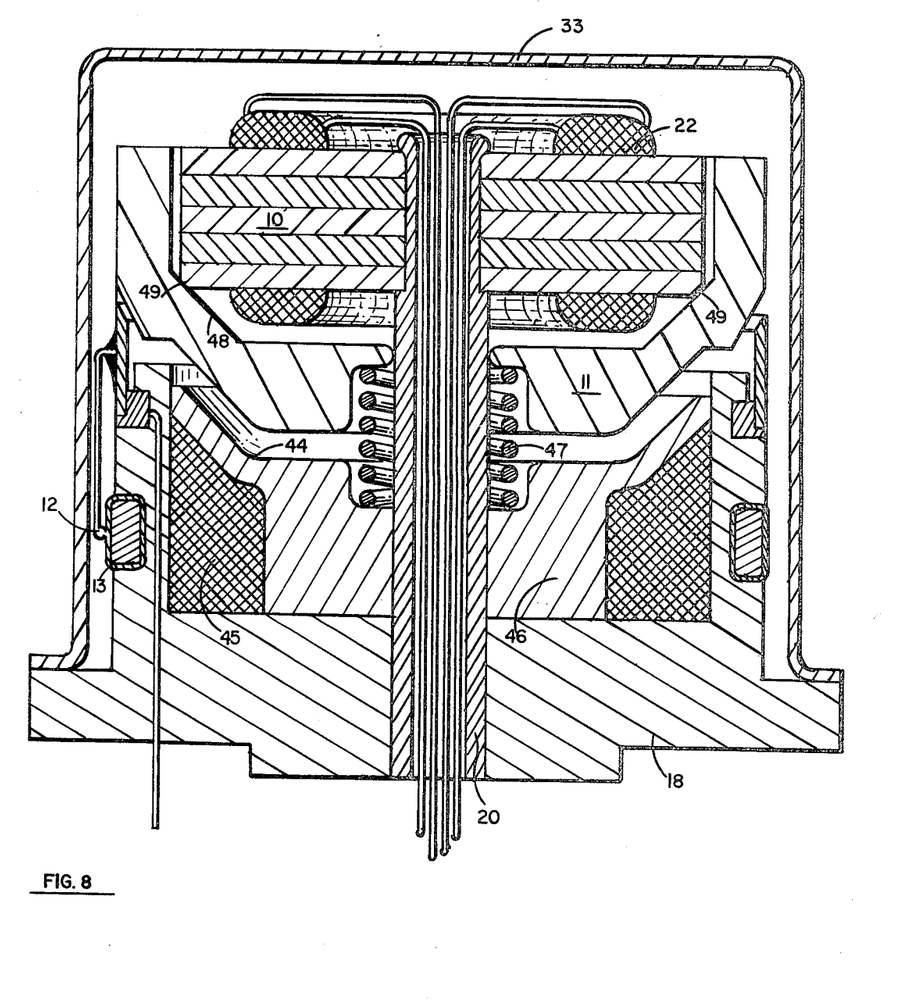
FIG. 8 is another alternate embodiment of the device of FIG. 4 in which an adjustable conical taper is employed for varying the electro-mechanical gain of the device.

Referring to FIG. 8, there is illustrated a further modification of the arrangement of FIG. 4 in which the lower portion of rotor element 11 is a truncated conical section, and in which there is also provided a corresponding or mating face or boss 44 in an axial electromagnetic actuator assembly comprising a winding 45 (adapted to be connected in series with the common lead of a star-connected stator); iron core 46 fixed to base 18 and concentrically disposed about stator shaft 20; and helical spring 47 enclosing shaft 20 and axially spacing rotor 11 apart from face 44.

In normal operation of such arrangement, the excitation of any one of the stator windings 22 also results in excitation of winding 45, urging axial motion of rotor 11, in opposition to the axial restraint provided by spring 47 as a function of the degree or level of excitation. Such axial motion also changes the radial spacing between face 44 and rotor 11 as to change the motion reduction ratio, $d/D_2$, described above. Therefore, the ratio $d/D_2$ is a function of the applied level of excitation. In the unexcited state of stator windings 22 and auxiliary winding 45, spring 47 urges an upper face 48 of rotor 11 against a lower shoulder 49 of stator assembly 10 as to apply a radially uniform restraining force, restraining both axial and rotational movement of rotor 11.

Figure 9:
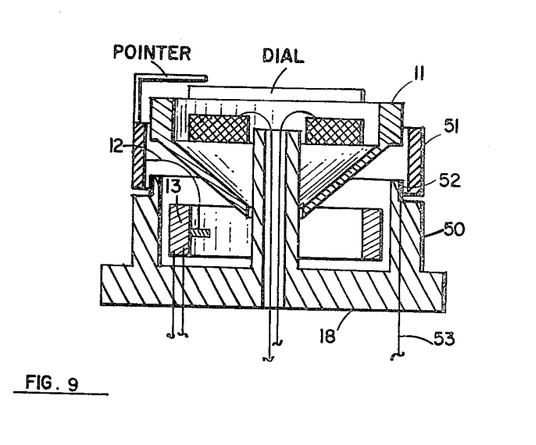
FIG. 9 is a further alternative embodiment of the device of FIG. 4 in which a position pick-off element is integral with the motive element.

In yet another embodiment of the arrangement of FIG. 4, the potentiometer wiper of the position pick-off element may be integral with the motive element, as shown in FIG. 9. In such arrangement, the potentiometer wiper assembly comprises an electrically conductive ring or cup 51 which is rotatably supported by the case 50 and includes a wiper element 12 (in electrical contact with a potentiometer element 13) fixed to the base 18 of case 50. Such ring or cup 51 is preferably of a spring-like electrically conductive material such as beryllium copper, while the supporting surface 52 is an electrically conductive surface which may be pressed on or molded onto insulative case 50 and to which an electrical wiper lead wire 53 is connected. Such ring may be a split ring; rather than closed, or may be corregated or crimped. In the unactuated state of the motor element, cup 51 grips case 50 and in an actuated state of the motor element, rotor 11 deforms elastic cup 51, releasing it from case 50 and causing rotation of cup 51 and potentiometer wiper 12.

Elastic ring 51 may also be alternatively arranged as a castelated cup, or a cup having a flexible upper rim, for allowing reduced clearances between the upper ring 51 and case 53 for effecting increased motion reduction, while allowing use of optimum clearances between the motor ring 11 and the stator pole pieces. Also, if the wiper 12 is attached at the lower end or apex of cup 51, then undesirable components of wiper motion may be reduced. In other words, the electrical and mechanical design features may each be optimized independently of the other. Further, such cup may provide the additional function of shielding the magnetic fields emanating from the motor, ring and driving cup.

Figure 10:
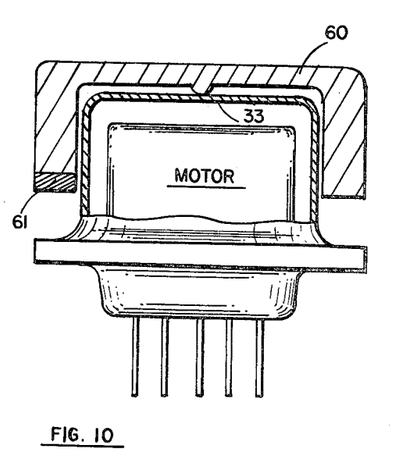
FIG. 10 illustrates a schematic arrangement for manually indexing the rotor of the motor concept to a selected initial condition.

A further aspect of the invention relates to means for manually indexing or setting the rotor in a selected initial condition, as shown in FIG. 10. A non-magnetic cup 60 is provided, into which external case 33 (of FIG. 4) is capable of nesting, cup 60 fitting easily enough over the top of case 33 as to be readily rotatable thereabout. An axial portion of the sides of cup 60 includes a permanent magnet pole piece 61 inserted therein at an axial position corresponding to the stator pole pieces of the motor within case 33. With cup 60 thus installed, the motor may (prior to excitation thereof) be manually indexed to a desired initial condition by manual rotation of cup 60, to provide the rotating magnetic field normally provided by excitation of the stator for walking the rotor around. Such initial condition may be determined by excitation and readout of the position pick-off or potentiometer (which cooperates with the motor rotor, as described above in connection with the description of FIG. 4).

Accordingly, there has been described integral means for combining a stepper motor function and motion reduction. Such arrangement is useful as a pulse integrator, the potentiometer read-out providing an analog of the time integral of a commutated pulse rate input. Where such pulse input corresponds to a digital code, the device may thus serve as a digital-to-analog converter and integrator. Such integral arrangement achieves motion reduction without the necessity of gear trains and may be accommodated in a miniaturized design. Such arrangement may also be employed in a feedback-type transducer for providing an electrical output signal as a function of a sensed parameter. Although the invention has been described in terms of utilizing a potentiometer as a sensing means, it is clear that other types of sensing means such as capacitive pick-offs or inductive pick-offs may be alternatively used. Further, a plurality of such elements may be ganged-on, as is well understood in the art, for such additional functions as analog multiplication and arbitrary function generators. Moreover, it is clear that the two dimensional or simple axis concept described above as readily applicable to a three dimensional, multi-axis or spherical device. Therefore, an improved electromechanical motor device has been described.

Although the invention has been described and illustrated in detail, it is to be clearly understood that the same is by way of example only, and not by way of limitation, the spirit and scope of this invention being limited ly by the terms of the appended claims.

I claim:
1. A stepper motor comprising
   a stator of a plurality of no fewer than three radially arranged, uniformly-spaced electromagnetic field pieces having windings connected in a star circuit arrangement, radial ends of which field pieces describe the locus of a circle having a geometric center, and
   a ring like rotor of magnetic material having a radius differing from that of said locus and rotatably mounted for hypocyclic motion thereabout in response to a sequential excitation of said electromagnetic field pieces.
2. The device of claim 1 in which the inner radial ends of said field pieces describe the locus of an outer circle and in which said ring forms an inner circle, whereby said hypocyclical motion results from rotation of said rotor about said outer circle.
3. The device of claim 1 in which there is provided bearing means at a point axially displaced from said locus for axially restraining said rotor relative to said locus of said field pieces, whereby said hypocyclical motion produces rotation of said ring about said point.
4. The device of claim 3 in which there is further provided pick-off means mechanically coupled to said rotor for indicating the rotational orientation thereof about said axis relative to said field pieces.
5. The device of claim 1 in which there is provided means responsive during an unexcited state of said field pieces for restraining said rotor in that orientation induced by a previously excited state of said field pieces.
6. The device of claim 5 in which said means for restraining comprises electromagnetically releasable, normally spring-loaded friction-force restraining means.
7. The device of claim 5 in which each of said field pieces has a winding electrically connected in star circuit with the others of said windings, and in which said means for restraining comprises electromagnetically releasable, normally spring-loaded friction-force restraining means, the electric circuit for which restraining means is connected in series with a common line of said star circuit.
8. The device of claim 5 in which said means for restraining comprises radially compressive means for inducing tangential forces in opposition to rotational motion of said rotor.
9. The device of claim 1 in which said rotor is magnetized for restraining motion thereof to that orientation induced by a previously excited state of said field pieces.
10. The device of claim 1 in which said field pieces are comprised of electromagnetic windings equally spaced upon a toroid comprising a stator ring enclosing a rotor ring, each ring of electrically-conductive magnetic material.
11. The device of claim 10 in which there is further provided a three-terminal rotor position pick-off means comprising
    a two-terminal potentiometer element electrically insulated from, internally concentric with and fixed relative to said stator, and external of and exposed to electrical contact with said rotor, and
    a potentiometer wiper element mechanically mounted upon and in electrical contact with an axial extent of said rotor and extending radially outward therefrom to said stator as to maintain electrical contact therewith, said stator forming a third terminal of said pick-off means.
12. The device of claim 2 in which said field pieces of said stator comprise an axially-extended circumferentially discontinuous male-threaded composite member and in which said rotor comprises a female-threaded member of limited axial dimension relative to said stator, a threaded portion of said rotor matingly engaging a threaded portion of said stator, whereby hypocyclic motion of said rotor about a longitudinal axis of said stator induces translational motion of said rotor parallel to said longitudinal axis.
13. The device of claim 1 in which said rotor is arranged to cooperate as an adjustable conical pendulum.
14. The device of claim 1 in which said rotor is arranged to cooperate as an adjustable conical pendulum and in which there is further provided means responsive during an unexcited state of said field pieces for restraining said rotor in that orientation induced by a previously excited state of said field pieces.
15. The device of claim 14 in which said means for restraining comprises electromagnetically releasable, normally spring loaded friction-force restraining means.
16. The device of claim 15 in which there is further provided electromagnetic means for concomitantly adjusting said adjustable conical pendulum and releasing said restraining means.
17. The device of claim 1 in which said ring is formed as a truncated conical section, and in which there is further provided axial spring preload means for restraining axial and rotational motion of said rotor; and axial electromagnetic actuation means for opposing said spring preload means.

18. The device of claim 1 in which there is further provided an enveloping case for hermetically sealing said device and allowing external motoring of said rotor.

19. A stepper motor comprising a stator of a plurality of no fewer than three radially arranged, uniformly - spaced electromagnetic field pieces having windings connected in a star circuit arrangement, radial ends of which field pieces describe the locus of a circle having a geometric center, and a ring-like rotor of magnetic material having a radius differing from that of said locus and rotatably mounted for hypocyclic motion thereabout in response to a sequential excitation of said electromagnetic field pieces, the outer radial ends of said field pieces describing the locus of an inner circle and said ring forming an outer circle, whereby said hypocyclical motion results from rotation of said rotor about said inner circle.

20. A stepper motor providing a translational output and comprising a stator of a plurality of no fewer than three radially arranged, uniformly - spaced electromagnetic field pieces having windings connected in a star circuit arrangement, radial ends of which field pieces describe the locus of a circle having a geometric center, and a ring-like rotor of magnetic material having a radius differing from that of said locus and rotatably mounted for hypocyclic motion thereabout in response to a sequential excitation of said electromagnetic field pieces, the inner radial ends of said field pieces describing the locus of an outer circle and said ring forming an inner circle, whereby said hypocyclical motion results from rotation of said rotor about said outer circle, a male-threaded axial member, a first axial extremity of which is rigidly connected coaxially with said rotor, a second axial extremity thereof being rotatably mounted relative to said stator, and a female-threaded output member matingly engaging and mounted upon a threaded portion of said axial member and restrained against rotation about said axial member relative to said stator.

21. A stepper motor comprising a stator of a plurality of no fewer than three radially arranged, uniformly-spaced electromagnetic field pieces having windings connected in a star circuit arrangement, radial ends of which field pieces describe the locus of a circle having a geometric center, said stator being fixedly mounted within a case having a longitudinal slot, a ring-like rotor of magnetic material having a radius differing from that of said locus and rotatably mounted for hypocyclic motion thereabout in response to a sequential excitation of said electromagnetic field pieces, the inner radial ends of said field pieces describing the locus of an outer circle and said ring forming an inner circle, whereby said hypocyclical motion results from rotation of said rotor about said outer circle, a male-threaded axial member, a first axial extremity of which is rigidly connected coaxially with said rotor, a second axial extremity thereof being rotatably mounted relative to said case, the longitudinal axis of said axial member being maintained generally parallel to said longitudinal slot, and a female-threaded output member matingly engaging and mounted upon a threaded portion of said axial member and slidably engaging said slot in said case as to be rotatably restrained against rotation about said longitudinal axis relative to said stator.

22. A stepper motor comprising a stator of a plurality of no fewer than three radially arranged, uniformly-spaced electromagnetic field pieces having windings connected in a star circuit arrangement, radial ends of which field pieces describe the locus of a circle having a geometric center, a ring-like rotor of magnetic material having a radius differing from that of said locus and rotatably mounted for hypocyclic motion thereabout in response to a sequential excitation of said electromagnetic field pieces, the outer radial ends of said field pieces describing the locus of an inner circle and said ring forming an outer circle, whereby said hypocyclical motion results from rotation of said rotor about said inner circle, and positive detenting means responsive during an unexcited state of said field pieces for restraining said rotor in that orientation induced by a previously excited state of said field pieces.

23. A stepper motor comprising a stator of a plurality of new fewer than three radially arranged, uniformly-spaced electromagnetic field pieces having windings connected in a star circuit arrangement, radial ends of which field pieces describe the locus of a circle having a geometric center, a ring-like rotor of magnetic material having a radius differing from that of said locus and rotatably mounted for hypocyclic motion thereabout in response to a sequential excitation of said electromagnetic field pieces, the outer radial ends of said field pieces describing the locus of an inner circle and said ring forming an outer circle, whereby said hypocyclical motion results from rotation of said rotor about said inner circle, and gearing means responsive during an unexcited state of said field pieces for restraining said rotor in that orientation induced by a previously excited state of said field pieces.

24. A stepper motor comprising a stator of a plurality of no fewer than three radially arranged, uniformly-spaced electromagnetic field pieces having windings connected in a star circuit arrangement, radial ends of which field pieces describe the locus of a circle having a geometric center, a ring like motor of magnetic material having a radius differing from that of said locus and rotatably mounted for hypocyclic motion thereabout in response to a sequential excitation of said electromagnetic field pieces, the outer radial ends of said field pieces describing the locus of an inner circle and said ring forming an outer circle, whereby said hypocyclical motion results from rotation of said rotor about said inner circle, and a flexible cup normally frictionally non-rotatably restrained relative to said stator, and arranged to be elastically deformed and rotated by actuation of said rotor in opposition to said restrain.

References Cited

UNITED STATES PATENTS

| 586,823 | 7/1897 | Patten | 310—82 |
|---|---|---|---|
| 2,393,045 | 1/1946 | Hotchner | 310—82 |
| 2,413,805 | 1/1947 | Vickers | 310—82 |
| 2,761,079 | 8/1956 | Giertz-Hedstrom | 310—82 |

MILTON O. HIRSHFIELD, Primary Examiner

R. SKUDY, Assistant Examiner

U.S. Cl. X.R.

310—67, 83, 267